July 5, 1966     G. F. GARLICK ETAL     3,259,745
BORON-12 BETA DECAY NEUTRON DETECTOR
Filed Oct. 18, 1963
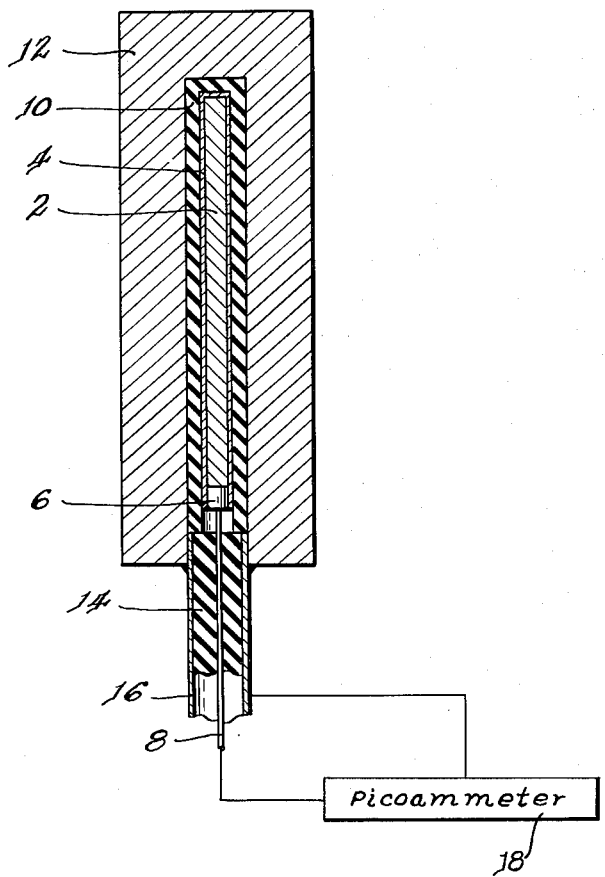
INVENTORS
George F. Garlick
Wilbur L. Bunch
BY
Roland A. Anderson
Attorney 3,259,745
BORON-12 BETA DECAY NEUTRON DETECTOR
George F. Garlick, Kennewick, and Wilbur L. Bunch, Richland, Wash., assignors to the United States of America as represented by the United States Atomic Energy Commission
Filed Oct. 18, 1963, Ser. No. 317,392
7 Claims. (Cl. 250—83.1)

The invention described herein was made in the course of, or under, a contract with the United States Atomic Energy Commission.

The present invention relates to an instrument measuring neutron flux under adverse temperature conditions where reliability and a long useful life are of high importance.

Ordinarily neutron flux measuring devices rely on the interaction of a neutron with an isotope of high neutron cross section. Inherently, materials having this high neutron capture cross section are used up rapidly, causing a correspondingly rapid decrease in the sensitivity of the detector. These instruments also depend on ionization effects in a gas, which can be distorted by other types of radiation.

The present invention uses an entirely new principle. The interaction utilized is that of a neutron with an isotope of very low cross section, to produce a product isotope of relatively short half life, which emits a beta particle on decaying. The flow of the beta particles is measured as an electrical current. This is a direct measurement as contrasted with the measurement of secondary effects as in gas ionization apparatus. There is a vanishingly small possibility of extraneous reactions masking the basic effect measured. Specifically, this instrument relies on the reaction of neutrons with boron-11 to produce boron-12 with subsequent decay to carbon-12 by beta emission, with a half life of 0.020 second. This short half life insures a fast response to change in flux.

Other objects and advantages are best seen from the following description taken together with the figure.

The figure shows a cross sectional view of one form of the instrument taken to include the axis thereof.

In this figure, a cylinder 2 of consolidated elemental boron-11 is encased in a sleeve 4 of a conductor, e.g., stainless steel. A solid plug 6 of a conductor, e.g., stainless steel, closes the bottom of sleeve 4. Lead wire 8 is in electrical contact with plug 6.

An insulating layer 10 encloses sleeve 4 and extends below the bottom of plug 6. A conducting envelope 12 of, e.g., stainless steel, encloses insulator 10 about its top and side surfaces. Electrical insulators 14 in an axial array enclose lead wire 8 for substantially its whole length. A metal shield 16 encloses the insulators 14. The assembly of shield 16, insulators 14, and lead wire 8 is an effective coaxial cable and has the usual electrical characteristics thereof.

In the particular instrument illustrated the insulators 10 and 14 are formed of solid blocks of ceramic insulating material. This gives a rigid, sturdy device. It should be understood, however, that this construction is not necessary and, in fact, may not be the most desirable in all cases. Less absorption of the beta particles, and therefore greater sensitivity, may be obtained by simply providing insulating spacers to separate sleeve 4 and envelope 12, leaving these two members separated only by an air gap or, for still greater sensitivity, by an evacuated space.

It is not necessary that members 4 and 12 be stainless steel. Other low neutron cross section conductors, e.g., titanium, zirconium, or magnesium, may be employed. However, the structure shown, i.e., having sleeve 4 and envelope 12 of stainless steel and insulators 10 and 14 of ceramic material, is a rugged, durable device usable at high temperatures.

It is not necessary that the members be cylindrical. Concentric spheres, parallel plates, or other configurations may be employed to meet specific geometrical requirements.

A suitable picoammeter 18 is connected between lead wire 8 and shield 16 at a suitable point removed from the point of insertion of the boron bearing section of the instrument in the flux to be measured.

In a particular embodiment of convenient size, cylinder 2 of boron-11 is $7/32''$ in diameter and $3''$ long. Sleeve 4 is 10 mils thick stainless steel, while the thickness of insulator 10 is $1/8''$. Envelope 12 is $1/2''$ thick stainless steel. The insulators 10 and 14 are of magnesium oxide, ceramic grade.

Each cubic centimeter of boron-11 contains approximately $1.36 \times 10^{23}$ atoms. The $(n, \gamma)$ reaction cross section $(\sigma)$ for this isotope is slightly less than $0.05 \times 10^{-24}$ cm.$^2$. The reaction rate for neutron capture in neutron flux $(\phi)$ is given by the triple product $\phi N \sigma$ where N is the number of atoms of boron-11 per cm.$^3$. The charge on a beta particle $(q)$ is approximately $1.6 \times 10^{-19}$ coulombs. The maximum current that is generated as a function of neutron flux level is given as $$I = \phi N \sigma q$$

The current corresponding to various flux levels is given in Table I.

Table 1

| $\phi$(n/cm.$^2$/sec.): | I (amps) |
|---|---|
| $10^{12}$ | $1.1 \times 10^{-9}$ |
| $10^{13}$ | $1.1 \times 10^{-8}$ |
| $10^{14}$ | $1.1 \times 10^{-7}$ |

These currents are well within the scope of a good picoammeter.

Beta particles resulting from the 0.020 sec. half life decay of boron-12 have a maximum energy of 13.4 mev. The short half life of the isotope is particularly advantageous since the generation of current will rapidly follow changes in the neutron flux level with no significant delay. The high energy is advantageous also. The long range of these particles permits the use of a large element and a relatively thick ceramic insulator, capable of remaining trouble-free for long periods in high flux reactors.

In the embodiment show above, some of the beta particles will be absorbed in the boron-11, the metal sleeve 4, or in the insulator 10. However, most of the beta particles have sufficient energy to penetrate these layers and be absorbed in the envelope 12, generating the current.

The boron-11 atoms are destroyed at the rate $\phi N \sigma$. In a flux of $10^{14}$ n/cm.$^2$/sec., boron-11 would be destroyed at the rate of $6.8 \times 10^{11}$ atoms/cm.$^3$/sec. Since 1 cm.$^3$ of boron-11 contains $1.36 \times 10^{23}$ atoms it would take $2 \times 10^9$ seconds ($\approx 63$ years) to destroy 1% of the boron-11 atoms at this flux level. Burnout would be negligible.

Any suitable current measuring device can be used to measure the current away from the reactor. The picoammeter, however, must have an input resistance at least a hundredfold less than the effective resistance of the combined cable-detector assembly. This will restrict the error limit due to leakage currents to less than 1%. The background current, due to capture of externally generated betas, is eliminated by choosing the collector as the reference for the circuit, and electrically grounding the outside conductor of the coaxial cable.

It is understood that the invention is not limited to the details above but only by the scope of the appended claims.

The embodiments of the invention in which an exclusive property or privilege is claimed are defined as follows:

1. A neutron detector comprising a body of boron enriched in the isotope boron-11, a conducting metal envelope enclosing said boron body and insulated therefrom, electrically conducting leads from said boron body and said envelope and means for measuring electrical current produced by the neutron irradiation of said boron body.

2. The detector of claim 1 in which the body and envelope are concentric cylinders.

3. The detector of claim 2 in which the insulator is a cylindrical body of a ceramic stable at an elevated temperature.

4. The detector of claim 3 in which the metal envelope is of a metal capable of withstanding elevated temperatures and of sufficient thickness to capture substantially all beta particles having energies not greater than 13.5 mev.

5. The detector of claim 4 where the insulator is a cylinder of ceramic grade MgO approximately ⅛" thick and the envelope is a hollow cylinder of stainless steel ½" thick in mechanical contact with said insulator.

6. The detector of claim 1 wherein the body and the envelope are separated by an air gap.

7. The detector of claim 1 wherein the body and the envelope are separated by an evacuated space.

No references cited.

RALPH G. NILSON, *Primary Examiner.*
ARCHIE R. BORCHELT, *Assistant Examiner.*